Nov. 29, 1966  H. R. BILLETER  3,288,498
COUPLING FOR ANGLE COCKS
Original Filed Oct. 22, 1963  2 Sheets-Sheet 1
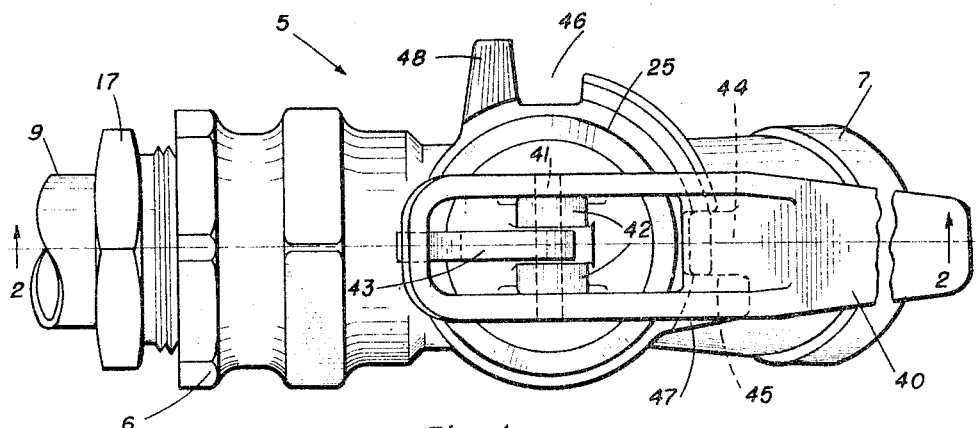
Fig. 1
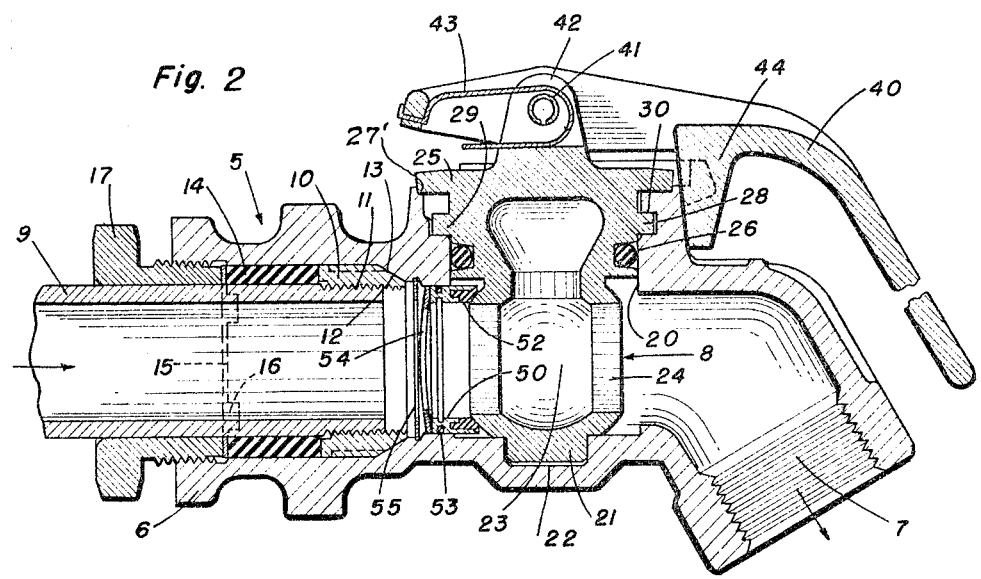
Fig. 2
Fig. 8  Fig. 9
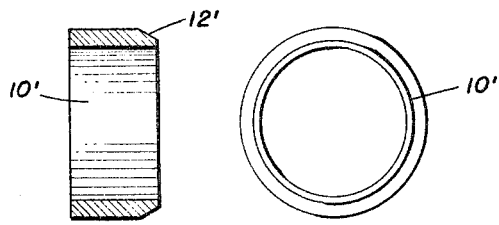
INVENTOR.
HENRY R. BILLETER
BY
PARKER & CARTER
ATTORNEYS Nov. 29, 1966  H. R. BILLETER  3,288,498
COUPLING FOR ANGLE COCKS
Original Filed Oct. 22, 1963  2 Sheets-Sheet 2
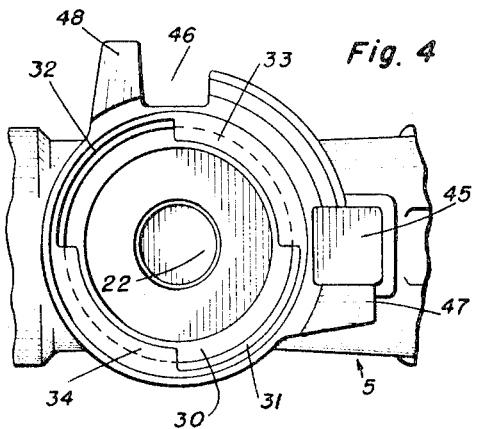
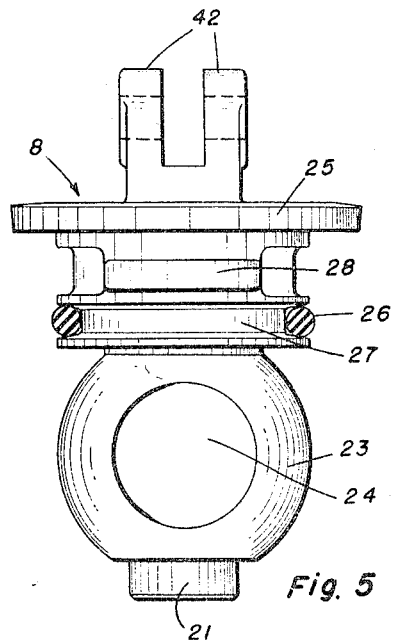
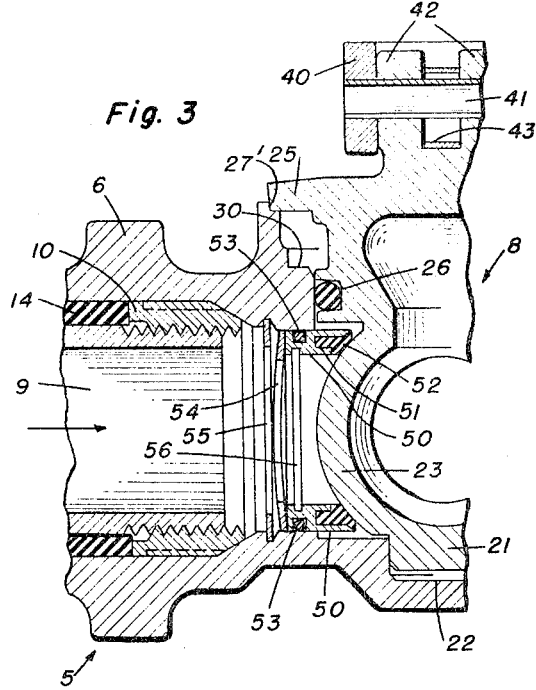
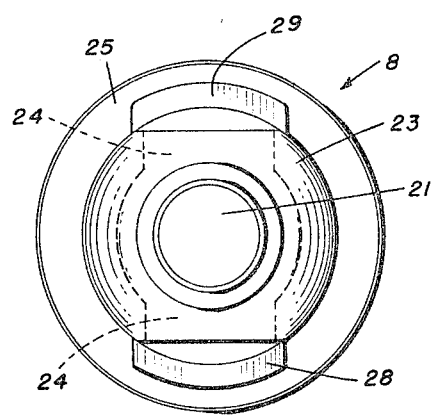
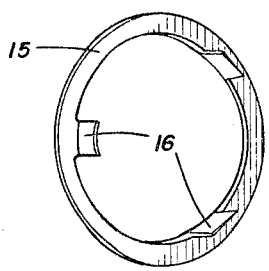
INVENTOR.
HENRY R. BILLETER
BY
PARKER & CARTER
ATTORNEYS

United States Patent Office 3,288,498
Patented Nov. 29, 1966

3,288,498
COUPLING FOR ANGLE COCKS
Henry R. Billeter, Deerfield, Ill., assignor to Sloan Valve Company, Chicago, Ill., a corporation of Illinois
Original application Oct. 22, 1963, Ser. No. 318,026, now Patent No. 3,184,212, dated May 18, 1965. Divided and this application Aug. 18, 1964, Ser. No. 390,436
1 Claim. (Cl. 285—334.1)

This application is a division of application Serial No. 318,026 filed October 22, 1963, now U.S. Patent 3,184,212.

This invention relates in general to valves but more particularly to an angle cock or valve for controlling air pressure passing through the brake pipe on railway trains.

An object of the invention is to provide an angle cock having new and improved sealing means for the ball valve member.

Another object of the invention is to provide novel sealing means for an angle cock in which the sealing means comprises a single unitary structure serving the dual purpose of sealing tightly against the valve member and against the valve body to prevent outward leakage.

A further object is to provide in an angle cock, novel means for locking and unlocking the rotatable valve member in the valve body facilitating the removal and replacement of the valve member.

It is another object of the invention to provide new and improved connecting means for connecting an air brake pipe with an angle cock.

A further object is to provide novel connecting means between an air brake pipe and the angle cock in which vibrations and shock incurred under service conditions, cannot cause the pipe to become disconnected or result in its rupture due to fatigue.

Another object is to provide a novel angle cock assembly in which the parts are all of simple construction, economically produced and readily assembled, and which will be efficient and durable under service conditions as well as positively leak-proof.

The foregoing and other objects including certain combinations of parts and arrangements thereof, will be described hereinafter, particularly set forth in the claim, and illustrated in the accompanying sheets of drawings, forming a part of the specification, which depict a preferred embodiment of the invention, in which;

FIGURE 1 is a top plan view of the device;

FIGURE 2 is a cross sectional side view taken along the line 2—2 of FIGURE 1;

FIGURE 3 is an enlarged view of a fragmentary portion of the device shown in the valve closed position;

FIGURE 4 is a fragmentary portion showing a top view with the operating handle and valve unit removed;

FIGURE 5 is a full side view of the valve member with its supporting parts;

FIGURE 6 is a bottom view of FIGURE 5;

FIGURE 7 is a perspective view of a friction ring; while,

FIGURES 8 and 9 are side and end views of a modified form of pipe adapter.

Referring to FIGURES 1 and 2, the angle cock or valve comprises generally a body portion 5 having an inlet end 6 and a threaded outlet 7 with a ball shaped valve member indicated generally at 8 for controlling the air flow through the valve. The outlet 7 connects with the usual flexible hose connection between two railway cars while the inlet 6 connects with the rigid air pipe 9 extending throughout the length of the railway car.

In the assembly of the connection, a pipe adapter 10 sleeve shaped, having internal pipe threads 11, is threaded on the end of the air pipe 9 and inserted into the inlet end 6 of the valve. A tapered end 12 of the pipe adapter 10 butts against a beveled shoulder 13 formed in the valve body 5. The adapter 10 has several wrench flats on it to facilitate its attachment to pipe 9. A flexible packing sleeve 14 is slid over pipe 9 and butted against the end of the pipe adapter 10 in the position shown. This packing sleeve 14 may be formed of any suitable flexible material such as rubber or plastic and is of a thickness to fit snug between the internal inlet surface of the valve body inlet 6 and around the outside surface of the pipe 9. A metal friction ring 15 (FIGURE 7) is next placed against packing sleeve 14 around pipe 9 and is provided with prongs 16 which imbed into the sleeve 14 and keep the ring 15 from being rotated. A lock nut 17 then is slid over pipe 9 and threaded into the valve inlet 6 against friction ring 15. The nut 17 slides on the friction ring 15 without rotating it as the nut is tightened up.

Tighteninng up lock nut 17 into valve body inlet 6 squeezes the packing sleeve 14 so it expands tightly against the inner walls of the body inlet 6 and around the outside of the air pipe 9 producing a tight seal against leakage of air from the interior of the valve body 5 to the outside of the pipe connection 9. As a further result of the tightening of lock nut 17, the tapered end 12 of pipe adapter 10 is held tight against body shoulder 13 thereby solidly anchoring the end of pipe 9 in the valve body and preventing withdrawal of the pipe.

The foregoing novel construction represents certain features highly desirable in practice when installed under service conditions on railway cars. The air pipe 9 is more securely supported and locked in place on the valve body than heretofore. It cannot be pulled out inadvertently as from shocks or vibrations occurring during such service operations. Neither can it be blown out since the combination of the lock nut 17 and squeezed flexible sleeve 14 securely anchors and locks it in place as well as provides a leak proof seal. An important advantage is that due to the flexible construction and arrangement, the iron pipe 9 will not becmoe cracked or broken by the constant vibration of the equipment as often happens. Neither will fatigue or crystallization of the metal pipe be apt to take place under these conditions since the flexible sleeve 14 serves to absorb these vibrations. The connection however can be readily pulled apart when the lock nut 17 is backed off.

FIGURES 8 and 9 show a modified form of pipe adapter 10 in which there are no internal threads for the air pipe 9 to screw into. The parts are all held tightly in leak proof engagement when the lock nut 17 is threaded into the valve body against flexible sleeve 14 to squeeze the same and the pipe 9 therefore cannot be pulled out. This arrangement is practical where the end of the pipe 9 is not threaded as it may be in some instances.

The valve member indicated generally at 8 and more specifically in FIGURE 5 consists of a single unitary structure inserted into the bore 20 of the valve body 5, the bottom end 21 being journaled in the body recess 22. The valve 23 is of hollow ball shape and has a transverse passage 24 therethrough which is rotatable in the bore 20 for controlling the passage of air through the valve body. The bonnet 25 of the ball unit closes the top opening of the bore 20 and O-ring seal 26 set in recess 27 in the bonnet prevents leakage outward through the top of the valve body while permitting easy rotation of the ball valve 23. The flat bonnet portion 25 is rotatable in the recess 27 in the top of the valve body.

The valve unit 8 is removably held in the body 5 by means of locking lugs 28 and 29 formed on opposite sides of the unit 8 which are adapted to be rotated in the annular groove 30 formed in the top of the valve body. When the valve unit 8 is inserted in the valve bore 20 the lugs 28 and 29 are placed in position in register with the slots or recesses 31 and 32 shown in FIGURE 4, and then the valve unit 8 is rotated 155 degrees clockwise until the lugs 28 and 29 are positioned under the flanges 33 and 34 formed in the body. The valve unit 8 is thereby locked in the position in the valve body as seen in FIGURES 1 and 2.

The handle 40 for opening and closing the valve is arranged for up and down movement about pin 41 journaled in a pair of upstanding lugs 42 formed at the top of the valve bonnet 25. A leaf spring 43 normally biases the handle end 40 downward. The valve handle 40 is locked in valve open position by a lug 44 formed under the handle, and resting in a recess 45 formed in the top of the valve body. To close the valve, the handle 40 is tilted upward against the tension of spring 43, then rotated 90 degrees counter-clockwise and when the handle is released, the handle lug 44 drops into a recess 46 in the body. The spring 43 holds the handle 40 positively locked in any of its positions against vibration of shocks produced under service conditions, while the stops 47 and 48 formed on the valve body limit rotation of the handle 40 within the 90 degree movement.

When it is necessary to remove the valve unit 8 from the valve body 5, the pivot pin 41 is first driven out and removed, enabling the handle 40 to be taken off the top of the unit. It is then possible to rotate the valve unit 8 counter-clockwise with a tool placed between lugs 42, to a position beyond that occupied by the stop lug 48. In this position, the locking lugs 28 and 29 are removed from the confines of the recesses 31 and 32 whereupon the valve unit 8 may be withdrawn directly from the valve body 5. This arrangement insures that the valve member 8 cannot be removed or the valve interior damaged by unauthorized persons. Prior to the above action, however, it will be understood and assumed that the valve sealing means, about to be described, has first been removed from the valve body through the body inlet 6.

An important feature of the present invention resides in the sealing means between the ball valve member 23 and the valve body 5, to prevent outward leakage and loss of air pressure from the air pipe 9. This sealing means includes an assembly consisting of a rigid annular supporting packing sleeve or collar 50 which is insertable through the inlet side 6 of the valve body. This sleeve 50 has an annular recess 51 in which there is suitably secured as by an adhesive, an annular sealing ring 52. This sealing ring 52 may be made of any flexible material such as rubber and bears directly upon the outer surface of the ball valve member 23 in all positions in which the valve member 23 may be rotated; that is in either the valve open or closed positions. The sleeve 50 slides freely into the body inlet 6 and has an O-ring 53 imbedded in its outer edge which bears against the inner surface of the body inlet and thereby effectively seals the same from escape of air outward through the bonnet 25 or through the outlet 7. The seal 52 serves a similar purpose together with the bonnet seal provided by the O-ring 26.

The packing sleeve 52 of the unit 50 is pressed into tight engagement with the surface of ball valve member 23 in all positions by a bowed ring-shaped spring 54 in turn held in position in the body inlet 6 by a retaining ring 55. Retaining ring 55 may be of the split washer type which snaps into an annular recess formed in the inlet of the valve body. A second ring such as 55 may be added if greater sealing pressures are required. The inner surface of sleeve 50 has a groove 56 formed therein into which a tool may be inserted to remove the sleeve outward through the inlet 6.

The foregoing sealing arrangement insures that at all times, leakage of air outward is prevented by the sealing ring 52 being constantly pressed into intimate and tight engagement with the ball valve member 23, under conditions of extreme vibration, shock, and temperature changes. Due to the action of spring washer 54 tight sealing is maintained and wear is automatically compensated for. The valve member 8 is rotatable easily and accurate control of air release is provided. The seal presents no obstruction to free air flow through the valve. The construction also permits quick and easy assembly of the parts, and the valve can be readily taken apart for repair or replacement.

What is claimed is:

In a pipe connection for use in connecting an angle cock body inlet with the air pipe of a railway car, means providing a shock-proof, leak-proof, and locked in connection between said air pipe and said body inlet, said connecting means comprising an annular pipe adapter threaded onto the end of said air pipe and inserted in the body inlet, the end of said pipe adapter and the inner end of said body inlet having tapered surfaces in abutting relationship, the end of said pipe adapter extending beyond the end of said air pipe, an annular flexible packing sleeve surrounding said air pipe and with its outer surface in contact with the inner surface of said body inlet, said packing member extending a substantial distance along said air pipe to provide extensive sealing contact between said air pipe and said body inlet, one end of said flexible packing sleeve abutting the end of said pipe adapter opposite its tapered end, a lock nut slidable around said air pipe and having threaed engagement with said body inlet, said lock nut abutting the opposite end of said flexible packing sleeve for squeezing said flexible packing sleeve against said pipe adapter and between said air pipe and said body inlet, and a thin slip friction washer around said air pipe and between said lock nut and said packing sleeve, said slip friction washer having prongs extending therefrom imbedded in said packing sleeve to prevent rotation of said friction washer as said lock nut is being tightened, said air pipe being so arranged as to be out of direct contact with the inner walls of said body inlet to thereby reduce possibility of fatigue and breaking of said air pipe under excessive repeated vibration and shocks.

References Cited by the Examiner
UNITED STATES PATENTS

| | | | |
|---|---|---|---|
| 174,572 | 3/1876 | Rankin | 285—414 |
| 762,545 | 6/1904 | Merriam | 277—117 |
| 924,041 | 6/1909 | Corlew | 251—148 |
| 1,031,018 | 7/1912 | McDonald | 285—356 |
| 1,057,757 | 4/1913 | Martin | 251—148 |
| 2,190,419 | 2/1940 | Evarts | 285—356 |
| 2,391,900 | 1/1946 | Hobbs | 285—356 |
| 2,422,597 | 6/1947 | Stewart | 285—356 |
| 2,877,979 | 3/1959 | Snyder | 251—174 |
| 3,194,592 | 7/1965 | Boughton | 277—235 |

M. CARY NELSON, *Primary Examiner.*

W. CLINE, *Assistant Examiner.*